(12) United States Patent
Yokomizo et al.

(10) Patent No.: US 10,388,989 B2
(45) Date of Patent: Aug. 20, 2019

(54) NON-AQUEOUS ELECTROLYTE, AND NON-AQUEOUS ELECTROLYTE SECONDARY CELL

(71) Applicant: ADEKA CORPORATION, Tokyo (JP)

(72) Inventors: Tomofumi Yokomizo, Tokyo (JP); Yuta Nohara, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/549,441

(22) PCT Filed: Mar. 2, 2016

(86) PCT No.: PCT/JP2016/056505
§ 371 (c)(1),
(2) Date: Aug. 8, 2017

(87) PCT Pub. No.: WO2016/147872
PCT Pub. Date: Sep. 22, 2016

(65) Prior Publication Data
US 2018/0026304 A1  Jan. 25, 2018

(30) Foreign Application Priority Data

Mar. 17, 2015  (JP) .................. 2015-053417

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01); *Y02T 10/7011* (2013.01)

(58) Field of Classification Search
CPC ............... H01M 10/0567; H01M 10/0525
See application file for complete search history.

(56) References Cited

U.S. PATENT DOCUMENTS 5,626,981 A  5/1997  Simon et al.
6,919,145 B1  7/2005  Kotato et al.
(Continued)

FOREIGN PATENT DOCUMENTS

CN  104584308  4/2015
EP  1467429  10/2004
(Continued)

OTHER PUBLICATIONS

International Search Report, PCT/JP2016/056505, dated Jun. 7, 2016.
(Continued)

*Primary Examiner* — Helen Oi K Conley
(74) *Attorney, Agent, or Firm* — Young & Thompson (57) ABSTRACT

A nonaqueous electrolyte having a lithium salt dissolved in an organic solvent and a nonaqueous secondary battery using the same are disclosed. The nonaqueous electrolyte is characterized by containing (A) at least one compound represented by general formula (1) (wherein symbols are as defined in the description) and (B) at least one compound having two or more groups selected from a vinyl group, an allyl group, and a propargyl group per molecule. Component (B) is preferably a compound having an ethylenically and acetylenically unsaturated bond equivalent of 150 or smaller.

4 Claims, 2 Drawing Sheets

(56) References Cited

U.S. PATENT DOCUMENTS

| | | |
|---|---|---|
| 9,595,718 B2 | 3/2017 | Yamaguchi |
| 2004/0038127 A1 | 2/2004 | Schlaikjer |
| 2014/0052447 A1 | 2/2014 | Tachibana et al. |
| 2015/0044551 A1 | 2/2015 | Taki et al. |
| 2015/0188142 A1 | 7/2015 | Yamaguchi |
| 2015/0206664 A1 | 7/2015 | Taki et al. |

FOREIGN PATENT DOCUMENTS

| | | |
|---|---|---|
| JP | 63-102173 | 5/1988 |
| JP | 04-87156 | 3/1992 |
| JP | 05-74486 | 3/1993 |
| JP | 10-50342 | 2/1998 |
| JP | 2007-258103 | 10/2007 |
| JP | 2013-118168 | 6/2013 |
| JP | 2014-038767 | 2/2014 |
| KR | 100948267 | 3/2010 |
| WO | WO2014/017321 | 1/2014 |
| WO | WO2016/013480 | 1/2016 |

OTHER PUBLICATIONS

Supplementary European Search Report dated Sep. 3, 2018 in corresponding European Patent Application No. 16764702.3.

NON-AQUEOUS ELECTROLYTE, AND NON-AQUEOUS ELECTROLYTE SECONDARY CELL

TECHNICAL FIELD

This invention relates to a nonaqueous secondary battery, more particularly a nonaqueous secondary battery using a nonaqueous electrolyte containing specific compounds.

BACKGROUND ART

With the recent spread of portable electronic equipment such as notebook computers, video camcorders, and personal digital assistances, nonaqueous secondary batteries having high voltage and high energy density have come to be used widely as a power source. From the concern for the environmental protection, electric-powered vehicles and hybrid-powered vehicles utilizing electric powder as a part of motive power have already been put to practical use.

Various additives for nonaqueous electrolyte have been proposed to provide nonaqueous secondary batteries with improved stability or electrical characteristics. Examples of such additives include 1,3-propane sultone (see Patent Literature 1 below), vinyl ethylene carbonate (see Patent Literature 2 below), vinylene carbonate (see Patent Literature 3 below), 1,3-propane sultone or butane sultone (see Patent Literature 4 below), vinylene carbonate (see Patent Literature 5 below), and vinyl ethylene carbonate (see Patent Literature 6 below). Among them, vinylene carbonate is widely used for its high effectiveness. These additive compounds are considered to form a stable film called a solid electrolyte interface (SEI) covering the surface of an anode, which film is expected to prevent reductive decomposition of an electrolyte.

The recent rise in the price of rare metals, such as cobalt and nickel, has rapidly boosted use and development of a cathode material containing a low-cost metal material, such as manganese or iron. A manganese-containing, lithium transition metal oxide is one of cathode materials of current interest for its excellent performance, such as capacity and power, in nonaqueous secondary batteries. It is known, however, that in a nonaqueous secondary battery having a manganese-containing lithium transition metal oxide as a cathode active material, manganese is liable to be eluted from the cathode to cause a side reaction, resulting in deterioration of battery performance, such as capacity and power.

To prevent elution of manganese from a cathode, various additives for a nonaqueous electrolyte have been proposed, including a disulfonic ester as disclosed, e.g., in Patent Literature 7 below. There has still been a demand for further improvements.

CITATION LIST

Patent Literature

Patent Literature 1: JP 63-102173A
Patent Literature 2: JP 4-87156A
Patent Literature 3: JP 5-74486A
Patent Literature 4: JP 10-50342A
Patent Literature 5: U.S. Pat. No. 5,626,981
Patent Literature 6: U.S. Pat. No. 6,919,145

SUMMARY OF INVENTION

Technical Problem

An object of the invention is to provide a nonaqueous secondary battery having a cathode containing a transition metal and lithium, which battery is prevented from deterioration due to the transition metal eluted from the cathode so as to maintain small internal resistance and high electrical capacity even after high-temperature storage or high-temperature charge and discharge cycles.

Solution to Problem

As a result of extensive investigations, the present inventors have found that the above object is accomplished by using a nonaqueous electrolyte containing compounds having a specific structure and completed the invention based on this finding.

The present invention provides a nonaqueous electrolyte comprising:
an organic solvent,
a lithium salt dissolved in the organic solvent,
(A) at least one compound represented by general formula (1):

[Chem. 1]

wherein $R^1$ represents an n-valent unsaturated hydrocarbon group having 2 to 6 carbon atoms or an n-valent arylene group having 6 to 12 carbon atoms; $R^2$, $R^3$, and $R^4$ each independently represent a saturated aliphatic hydrocarbon group having 1 to 20 carbon atoms or an aromatic hydrocarbon group having 6 to 20 carbon atoms; and n represents an integer 2 to 6, and
(B) at least one compound having two or more groups selected from a vinyl group, an allyl group, and a propargyl group per molecule.

The present invention also provides a nonaqueous secondary battery comprising the nonaqueous electrolyte.

Advantageous Effects of Invention

The invention provides a nonaqueous secondary battery using a nonaqueous electrolyte that contains specific compounds thereby to sufficiently provide overcharge protection, which battery thus maintains a small internal resistance and a high electrical capacity even after high-temperature storage or high-temperature charge and discharge cycles.

DESCRIPTION OF EMBODIMENTS

The nonaqueous secondary battery of the invention will be described in detail with reference to its preferred embodiments.

Nonaqueous Electrolyte

The nonaqueous electrolyte of the invention will be described. The nonaqueous electrolyte of the invention is a solution of a lithium salt in an organic solvent and contains at least (A) a compound represented by general formula (1) and (B) a compound having two or more groups selected from a vinyl group, an allyl group, and a propargyl group per molecule, exclusive of the compound represented by general formula (1).

The compound represented by general formula (1) (hereinafter also referred to as component (A)) will be described.

In general formula (1), the C2-C6 unsaturated hydrocarbon group as represented by $R^1$ is not limited as long as it is an n-divalent hydrocarbon group having an unsaturated bond. Examples of the divalent unsaturated hydrocarbon group (n=2) include vinylene, propenylene, isopropenylene, butenylene, pentenylene, hexenylene, 1-propenylen-2,3-diyl, ethynylene, propynylene, butynylene, pentynylene, and hexynylene.

Examples of the trivalent unsaturated hydrocarbon group (n=3) are shown in [Chem. 2] below.

Examples of the tetravalent unsaturated hydrocarbon group (n=4) are shown in [Chem. 3] below.

[Chem. 2]

wherein the asterisk symbol indicates the position where an adjacent group is bonded.

[Chem. 3]

wherein the asterisk symbol indicates the position where an adjacent group is bonded.

The C6-C12 arylene group as represented by $R^1$ is not particularly limited as long as it is n-valent and has an aromatic ring. Examples of the divalent arylene group (n=2) include 1,2-phenylene, 1,3-phenylene, 1,4-phenylene, 2,3-naphthalene, 1,4-naphthalene, 1,5-naphthalene, and 1,8-naphthalene.

Examples of the trivalent arylene group (n=3) are shown in [Chem. 4] below.

Examples of the tetravalent arylene group (n=4) are shown in [Chem. 5] below.

[Chem. 4]

wherein the asterisk symbol indicates the position where an adjacent group is bonded.

[Chem. 5]

wherein the asterisk symbol indicates the position where an adjacent group is bonded.

The C1-C20 hydrocarbon group as represented by $R^2$, $R^3$, and $R^4$ in general formula (1) is exemplified by a C1-C20 saturated or unsaturated aliphatic hydrocarbon group and a C6-C20 aromatic hydrocarbon group. Examples of the C1-C20 saturated or unsaturated hydrocarbon group include methyl, ethyl, propyl, 2-propynyl, butyl, isobutyl, s-butyl, t-butyl, pentyl, isopentyl, hexyl, decyl, dodecyl, octadecyl, vinyl, ethynyl, allyl, propargyl, 3-butenyl, isobutenyl, 3-butynyl, 4-pentenyl, and 5-hexenyl. Examples of the C6-C20 aromatic hydrocarbon group include phenyl, naphthyl, cyclohexylphenyl, biphenyl, fluorenyl, 2'-phenyl-propylphenyl, benzyl, and naphthylmethyl.

In general formula (1), a number n (two to six) of $R^2$, $R^3$, and $R^4$ groups each may be either the same or different but are preferably the same because of ease of synthesis.

In general formula (1), n is an integer of 2 to 6. While the effects of the invention are exhibited as long as n is in that range, n is preferably 2 to 4. When n is 1, the cycle characteristics of the resulting battery are reduced. When n is greater than 6, such a compound is difficult to be purified due to an elevated boiling point.

Specific examples of the compound of general formula (1) in which n is 2 include bis(trimethylsilyl) acetylenedicarboxylate, bis(ethyldimethylsilyl) acetylenedicarboxylate, bis(dimethylpropylsilyl) acetylenedicarboxylate, bis(dimethylbutylsilyl) acetylenedicarboxylate, bis(dimethyl vinylsilyl) acetylenedicarboxylate, bis(trimethylsilyl) fumarate, bis(dimethylvinylsilyl) fumarate, bis(triethylsilyl) fumarate, bis(tri-isopropylsilyl) fumarate, bis(dimethylphenylsilyl) fumarate, bis(benzyldimethylsilyl) fumarate, bis(allyldimethylsilyl) fumarate, bis(trimethylsilyl) maleate, bis(dimethylvinylsilyl)maleate, bis(n-butyldimethylsilyl) maleate, bis(dimethylphenylsilyl) maleate, bis(trimethylsilyl) phthalate, bis(dimethylvinylsilyl) phthalate, bis(n-butyldimethylsilyl) phthalate, bis(dimethylphenylsilyl) phthalate, bis(trimethylsilyl) isophthalate, bis(dimethylvinylsilyl) isophthalate, bis(n-butyldimethylsilyl) isophthalate, bis(dimethylphenylsilyl) isophthalate, bis(trimethylsilyl) terephthalate, bis(dimethylvinylsilyl) terephthalate, bis(n-butyldimethylsilyl) terephthalate, bis(dimethylphenylsilyl) terephthalate, and bis(trimethylsilyl) itaconate.

Specific examples of the compound of formula (1) in which n is 3 include tris(trimethylsilyl) trans-aconitate, tris(triethylsilyl) trans-aconitate, and tris(trimethylsilyl) cis-aconitate.

Specific examples of the compound of formula (1) in which n is 4 include tetrakis(trimethylsilyl) meso-butane-1,2,3,4-tetracarboxylate and tetrakis(triethylsilyl) meso-butane-1,2,3,4-tetracarboxylate.

In the nonaqueous electrolyte of the invention, these compounds of general formula (1) may be used singly or in combination of two or more thereof.

Too small a content of the compound of general formula (1) in the nonaqueous electrolyte of the invention would fail to provide sufficient effects, and too large the content would fail to give an increased effect reflecting the increased content or rather result in adverse effect on the characteristics of the nonaqueous electrolyte. The content of the compound of general formula (1) in the nonaqueous electrolyte is preferably 0.001 to 10 mass %, more preferably 0.01 to 8 mass %, most preferably 0.1 to 5 mass %.

The compound having two or more groups selected from a vinyl group, an allyl group, and a propargyl group per molecule (hereinafter also referred to as component (B)) will then be described.

Component (B), which has two or more groups selected from a vinyl group, an allyl group, and a propargyl group per molecule, is not particularly limited unless it fulfills the definition of component (A); however, a compound having an oxygen atom in the molecule is preferably used because the effects of the invention is enhanced. In particular, a compound having at least one linkage selected from —C—O—C—, —Si—O—Si—, —C—O—Si—, —O—C(=O)—, and —C(=O)—O— is preferred, and a compound having at least one of —C—O—C—, —Si—O—Si—, and —C—O—Si— is more preferred.

Of the compounds useful as component (B), those having an ethylenically (vinyl or allyl) and acetylenically (propargyl) unsaturated bond equivalent of 150 or smaller are preferred because the effects of the invention is enhanced.

Specific examples of component (B) include, but are not limited to, compounds B-1 through B-17 below.

[Chem. 6]

B-1

B-2

B-3

B-4

B-5

B-6

-continued

B-7

B-8

B-9

B-10

B-11

[Chem. 6A]

B-12

B-13

B-14

B-15

-continued

B-16

B-17

These compounds as component (B) may be used singly or in combination of two or more in the nonaqueous electrolyte of the invention. Too small a content of component (B) in the nonaqueous electrolyte of the invention would fail to provide sufficient effects, and too large the content would fail to give an increased effect reflecting the increased content or rather result in adverse effect on the characteristics of the nonaqueous electrolyte. The content of component (B) in the nonaqueous electrolyte is preferably 0.001 to 10 mass %, more preferably 0.01 to 8 mass %, most preferably 0.1 to 5 mass %.

Components other than components (A) and (B) of the nonaqueous electrolyte of the invention will next be described.

The nonaqueous electrolyte of the invention contains an organic solvent. The organic solvent that can be used in the nonaqueous electrolyte according to the invention may be one of or a combination of two or more of organic solvents commonly used in nonaqueous electrolytes. Useful organic solvents include saturated cyclic carbonate compounds, saturated cyclic ester compounds, sulfoxide compounds, sulfone compounds, amide compounds, saturated acyclic carbonate compounds, acyclic ether compounds, cyclic ether compounds, and saturated acyclic ester compounds.

Inter alia, saturated cyclic carbonate compounds, saturated cyclic ester compounds, sulfoxide compounds, sulfone compounds, and amide compounds have a high relative permittivity and therefore contribute to an increase in the dielectric constant of the nonaqueous electrolyte. Saturated cyclic carbonate compounds are particularly preferred. Examples of the saturated cyclic carbonate compounds include ethylene carbonate, 1-fluoroethylene carbonate, 1,2-propylene carbonate, 1,3-propylene carbonate, 1,2-butylene carbonate, 1,3-butylene carbonate, and 1,1-dimethylethylene carbonate. Examples of the saturated cyclic ester compounds include γ-butyrolactone, γ-valerolactone, γ-caprolactone, δ-hexanolacotne, and δ-octanolactone. Examples of the sulfoxide compounds include dimethyl sulfoxide, diethyl sulfoxide, dipropyl sulfoxide, diphenyl sulfoxide, and thiophene. Examples of the sulfone compounds include dimethyl sulfone, diethyl sulfone, dipropyl sulfone, diphenyl sulfone, sulfolane (also called tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, with sulfolane and tetramethyl sulfolane being preferred. Examples of the amide compounds are N-methylpyrrolidone, dimethylformamide, and dimethylacetamide.

Of the above described organic solvents, saturated acyclic carbonate compounds, acyclic ether compounds, cyclic ether compounds, and saturated acyclic ester compounds decrease the viscosity of the nonaqueous electrolyte and increase mobility of electrolyte ions thereby to improve battery characteristics, such as power density. Such a low viscosity also brings about improvement on the low temperature performance of the nonaqueous electrolyte. Inter alia, saturated acyclic carbonate compounds are preferred. Examples of saturated acyclic carbonate compounds include dimethyl carbonate (DMC), ethylmethyl carbonate (EMC), diethyl carbonate (DEC), ethylbutyl carbonate, methyl-t-butyl carbonate, diisopropyl carbonate, and t-butylpropyl carbonate. Examples of the acyclic or cyclic ether compounds include dimethoxyethane (DME), ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, and diethylene glycol bis(trifluoroethyl) ether, with dioxolane being preferred.

The saturated acyclic ester compounds are preferably mono- or diester compounds having a total of 2 to 8 carbon atoms per molecule, such as methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Preferred of them are methyl formate, ethyl formate, methyl acetate, ethyl acetate, propyl acetate, isobutyl acetate, butyl acetate, methyl propionate, and ethyl propionate.

Acetonitrile, propionitrile, nitromethane, and their derivatives are also usable as an organic solvent.

As the lithium salt used in the nonaqueous electrolyte of the invention, any of conventionally known lithium salts can be used. Examples include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAF_4$, LiSCN, $LiClO_4$, LiCl, LiF, LiBr, LiI, $LiAlF_4$, $LiAlCl_4$, and their derivatives. It is preferred to use at least one selected from the group consisting of $LiPF_6$, $LiBF_4$, $LiClO_4$, $LiAsF_6$, $LiCF_3SO_3$, $LiC(CF_3SO_2)_3$, $LiCF_3SO_3$ derivatives, and $LiC(CF_3SO_2)_3$ derivatives in terms of good electrical characteristics.

The lithium salt is preferably dissolved in the organic solvent in a concentration of 0.1 to 3.0 mol/l, more preferably 0.5 to 2.0 mol/l. At lithium salt concentrations lower than 0.1 mol/l, the resulting battery may fail to provide a sufficient current density. Lithium salt concentrations higher than 3.0 mol/l can impair the stability of the nonaqueous electrolyte. The lithium salts described may be used in combination of two or more thereof.

While the effects of adding components (A) and (B) include overcharge protection, the nonaqueous electrolyte of the invention may further contain an overcharge protection agent. Examples of useful overcharge protection agents include aromatic compounds, such as biphenyl, alkylbiphenyls, terphenyl, partially hydrogenated terphenyl, cyclohexylbenzene, t-butylbenzene, t-amylbenzene, diphenyl ether, and dibenzofuran; partial fluorination products of the above aromatic compounds, such as 2-fluorobiphenyl, o-cyclohexylfluorobenzene, and p-cyclohexylfluorobenzene; and fluorine-containing anisole compounds, such as 2,4-difluoroanisole, 2,5-difluoroanisole, 2,6-difluoroanisole, and 3,5-difluoroanisole. Preferred of them are aromatic compounds, such as biphenyl, alkylbiphenyls, terphenyl, partially hydrogenated terphenyl, cyclohexylbenzene, t-butylbenzene, t-amylbenzene, diphenyl ether, and dibenzofuran.

A compound represented by general formula (4) below is also preferably used as an overcharge protection agent.

[Chem. 7]

(4)

wherein $R^{21}$, $R^{22}$, $R^{23}$, $R^{24}$, and $R^{25}$ each independently represent an optionally substituted aliphatic hydrocarbon group having 1 to 20 carbon atoms, a halogen atom, a nitrile group, a nitro group, an amino group, a carboxyl group, a hydroxy group, a thiol group, a formyl group, a sulfone group, —$SiR^{29}R^{30}R^{31}$, or a phosphate group, an alkylene moiety of the C1-C20 aliphatic hydrocarbon group being optionally interrupted at 1 to 3 sites (which may include the site where the aliphatic hydrocarbon group bonds to the benzene ring) by —O—, —CO—, —OCO—, —COO—, —O—CO—O—, —NR'—, —S—, —SO—, —$SO_2$—, —NR'—CO—, or —CO—NR'—, provided that the interrupting groups do not join each other; R' represents an aliphatic hydrocarbon group having 1 to 5 carbon atoms; at least one of $R^{21}$, $R^{22}$, $R^{23}$, $R^{24}$, and $R^{25}$ is a C1-C20 aliphatic hydrocarbon group substituted with at least one halogen atom; $R^{28}$ represents a p-valent group; $R^{26}$, $R^{27}$, $R^{29}$, $R^{30}$, and $R^{31}$ each independently represent an optionally substituted aliphatic hydrocarbon group having 1 to 20 carbon atoms or an optionally substituted aromatic hydrocarbon group having 6 to 20 carbon atoms; and p represents an integer 1 to 3.

The C1-C20 aliphatic hydrocarbon group and C6-C20 aromatic hydrocarbon group as represented by $R^{21}$ to $R^{27}$ and $R^{29}$ to $R^{31}$ in general formula (4) are exemplified by those described with respect to general formula (1).

The C1-C20 aliphatic hydrocarbon group as represented by $R^{21}$ to $R^{26}$ and the C6-C20 aromatic hydrocarbon group as represented by $R^{26}$, $R^{27}$, $R^{29}$, $R^{30}$, and $R^{31}$ are exemplified by those described with respect to general formula (1).

Specific examples of the compound of general formula (4) include, but are not limited to, compounds 4-1 through 4-4 shown below.

[Chem. 8]

4-1

4-2

4-3

4-4

The amount of the overcharge protection agent, if used, is preferably, but not limited to, 1 to 500 parts by mass per 100 parts by mass of the sum of components (A) and (B).

A flame retardant of halogen, phosphorus or other types may be added to the nonaqueous electrolyte of the invention as appropriate to impart flame retardancy. Addition of too small an amount of a flame retardant fails to exhibit sufficient effects. To the contrary, too large an amount of a flame retardant would fail to give increased effects reflecting the increased amount, and also may adversely affect the battery performance. Accordingly, the amount of a flame retardant to be added is preferably 1% to 50%, more preferably 3% to 10%, by mass relative to the organic solvent of the nonaqueous electrode.

The nonaqueous electrolyte of the invention is useful in both primary batteries and secondary batteries. The above discussed effects of the nonaqueous electrolyte of the invention are pronouncedly exhibited when it is used in nonaqueous secondary batteries as is claimed in the present invention, particularly a lithium ion secondary battery.

Nonaqueous Secondary Battery

The nonaqueous secondary battery of the invention has the nonaqueous electrolyte of the invention and is preferably a nonaqueous secondary battery having an anode capable of intercalating and deintercalating lithium, a cathode containing a transition metal and lithium, and a nonaqueous electrolyte having a lithium salt dissolved in an organic solvent, wherein the nonaqueous electrolyte is the nonaqueous electrolyte of the invention.

Anode

Any anode capable of intercalating and deintercalating lithium can be used in the invention with no limitation. A preferred anode is as follows. The anode of the nonaqueous secondary battery according to the invention is made by dispersing an anode active material and a binder in an organic solvent or water and applying the resulting slurry to a current collector, followed by drying into a sheet form. If desired, an electroconductive material is incorporated therein.

Examples of the anode active material include, but are not limited to, natural graphite, synthetic graphite, non-graphitizing carbon, graphitizing carbon, lithium, lithium alloys, tin alloys, silicon alloys, silicon oxide, and titanium oxide. Preferred of them are those containing carbon, i.e., natural graphite, synthetic graphite, non-graphitizing carbon, and graphitizing carbon, with a view to enhancing the effects of the invention, i.e., overcharge protection and retention of small internal resistance and high electrical capacity even after charge/discharge cycles. The anode may contain a mixture of the above enumerated active materials, in which case the mixture preferably contains a carbon-containing active material.

Examples of the binder used in the anode include, but are not limited to, polyvinylidene fluoride, polytetrafluoroethylene, EPDM, SBR, NBR, fluororubber, and polyacrylic acid. The binder is preferably used in an amount of 0.001 to 5 parts by mass, more preferably 0.05 to 3 parts by mass, even more preferably 0.01 to 2 parts by mass, per 100 parts by mass of the anode active material.

Examples of the solvent for preparing the slurry for the anode include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran. The solvent is preferably used in an amount of 30 to 300 parts by mass, more preferably 50 to 200 parts by mass, per 100 parts by mass of the anode active material.

The current collector of the anode is usually made of copper, nickel, stainless steel, nickel-plated copper, or the like.

Examples of the electroconductive material that may be used where needed include, but are not limited to, graphene particles, graphite particles, particles of amorphous carbon materials, such as carbon blacks (e.g., acetylene black and ketjen black) and needle coke, and carbon nanofiber.

Cathode

The cathode containing a transition metal and lithium that can be used in the invention is prepared in the following manner. A slurry of a cathode active material, a binder, an electroconductive material, etc. in an organic solvent or water is applied to a current collector and dried into a sheet form. The cathode active material contains a transition metal and lithium. Preferred is a substance containing one transition metal and lithium, such as a lithium-transition metal complex oxide or a lithium-containing transition metal phosphate compound. A mixture of such substances may be used. The transition metal of the lithium-transition metal complex oxide is preferably vanadium, titanium, chromium, manganese, iron, cobalt, nickel, or copper. Examples of the lithium-transition metal complex oxide include a lithium-cobalt complex oxide (e.g., $LiCoO_2$), a lithium-nickel complex oxide (e.g., $LiNiO_2$), a lithium-manganese complex oxide (e.g., $LiMnO_2$, $LiMn_2O_4$, or $Li_2MnO_3$), each of which may have part of its transition metal atom substituted with other metal element, e.g., aluminum, titanium, vanadium, chromium, manganese, iron, cobalt, lithium, nickel, copper, zinc, magnesium, gallium, or zirconium. Examples of such substituted complex oxides include $Li_{1.1}Mn_{1.8}Mg_{0.1}O_4$, $Li_{1.1}Mn_{1.85}Al_{0.05}O_4$, $LiNi_{0.5}Co_{0.2}Mn_{0.3}O_2$, $LiNi_{0.5}Mn_{0.5}O_2$, $LiNi_{0.80}Co_{0.17}Al_{0.03}O_2$, $LiNi_{1/3}Co_{1/3}Mn_{1/3}O_2$, $LiMn_{1.8}Al_{0.2}O_4$, and $LiMn_{1.5}Ni_{0.5}O_4$. The transition metal of the lithium-containing transition metal phosphate compound is preferably vanadium, titanium, manganese, iron, cobalt, or nickel. Examples of the lithium-containing transition metal phosphate compound include iron phosphates (e.g., $LiFePO_4$) and cobalt phosphates (e.g., $LiCoPO_4$), each of which may have part of its transition metal substituted with other metal element, e.g., aluminum, titanium, vanadium, chromium, manganese, iron, cobalt, lithium, nickel, copper, zinc, magnesium, gallium, zirconium, or niobium. Preferred of them are manganese-containing lithium-transition metal complex oxides, particularly $LiMn_2O_4$, $Li_{1.1}Mn_{1.8}Mg_{0.1}O_4$, $Li_{1.1}Mn_{1.85}Al_{0.05}O_4$, $LiNi_{1/3}Co_{1/3}Mn_{1/3}O_2$, and $LiNi_{0.5}Co_{0.2}Mn_{0.3}O_2$, with a view to enhancing the effects of the invention, i.e., overcharge protection and retention of small internal resistance and high electrical capacity even after charge/discharge cycles.

Examples of the binder and the solvent used to prepare the slurry for making the cathode are the same as those useful to make the anode. The binder is preferably used in an amount of 0.001 to 20 parts by mass, more preferably 0.01 to 10 parts by mass, even more preferably 0.02 to 8 parts by mass, per 100 parts by mass of the cathode active material. The solvent is preferably used in an amount of 30 to 300 parts by mass, more preferably 50 to 200 parts by mass, per 100 parts by mass of the cathode active material.

Examples of the electroconductive material that may be used in the cathode include, but are not limited to, graphene particles, graphite particles, particles of amorphous carbon materials, such as carbon blacks (e.g., acetylene black and ketjen black) and needle coke, and carbon nanofiber. The amount of the electroconductive material to be used is preferably 0.01 to 20 parts by mass, more preferably 0.1 to 10 parts by mass, per 100 parts by mass of the cathode active material.

The current collector of the cathode is usually made of aluminum, stainless steel, nickel-plated steel, or the like.

It is preferable to interpose a separator between the cathode and the anode in the nonaqueous secondary battery of the invention. A commonly employed microporous polymer film can be used as a separator with no particular restriction. Polymer materials providing a microporous film separator include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers such as polyethylene oxide and polypropylene oxide, celluloses, such as carboxymethyl cellulose and hydroxypropyl cellulose, poly(meth)acrylic acid and esters thereof; derivatives of these polymers; copolymers of monomers of the recited polymers; and polyblends of these polymer materials. The separator may be a single film or a composite film composed of two or more films. Various additives may be incorporated into the separator film with no particular limitation on the kind and amount. A film made of polyethylene, polypropylene, polyvinylidene fluoride, or polysulfone is particularly preferred for use in the nonaqueous secondary battery of the invention.

The separator film is microporous for allowing the electrolyte ions to penetrate therethrough. Such a microporous film can be prepared by "a phase separation method" or "a stretching method." The former comprises inducing microphase separation in a solution of a polymer in a solvent in film form and removing the solvent by extraction, and the latter comprises extruding a molten polymer at a high draft ratio, heat treating the extruded film to unidirectionally align the crystals, and stretching the film to form voids between crystals. The method of microporous film formation is chosen according to the film material.

In order to ensure safety of the nonaqueous secondary battery of the invention, a phenol antioxidant, a phosphorus antioxidant, a thioether antioxidant, a hindered amine compound, or a like stabilizer may be added to the cathode materials, the nonaqueous electrolyte, or the separator.

Figure 1:
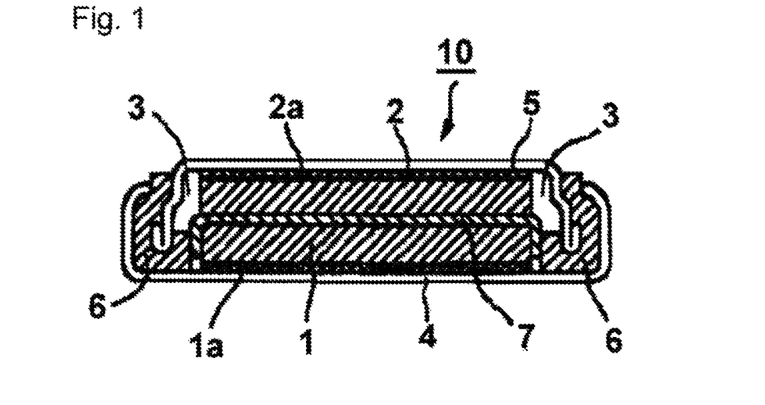
FIG. 1 is a schematic cross-sectional view illustrating a structure of an exemplary coin-shaped nonaqueous secondary battery according to the present invention.

The nonaqueous secondary battery of the invention is not particularly limited in shape and may be, for example, coin-shaped, cylindrical, or rectangular. FIG. 1 illustrates an example of a coin-shaped nonaqueous secondary battery of the invention, and FIGS. 2 and 3 each illustrate an example of a cylindrical nonaqueous secondary battery of the invention.

The coin battery 10 illustrated in FIG. 1 has a cathode 1 capable of deintercalating lithium ions, a cathode current collector 1a, an anode 2 made of a carbonaceous material capable of intercalating/deintercalating lithium ions released from the cathode, an anode current collector 2a, a nonaqueous electrolyte 3 according to the invention, a cathode case 4 made of stainless steel, an anode case 5 made of stainless steel, a polypropylene gasket 6, and a polyethylene separator 7.

Figure 2:
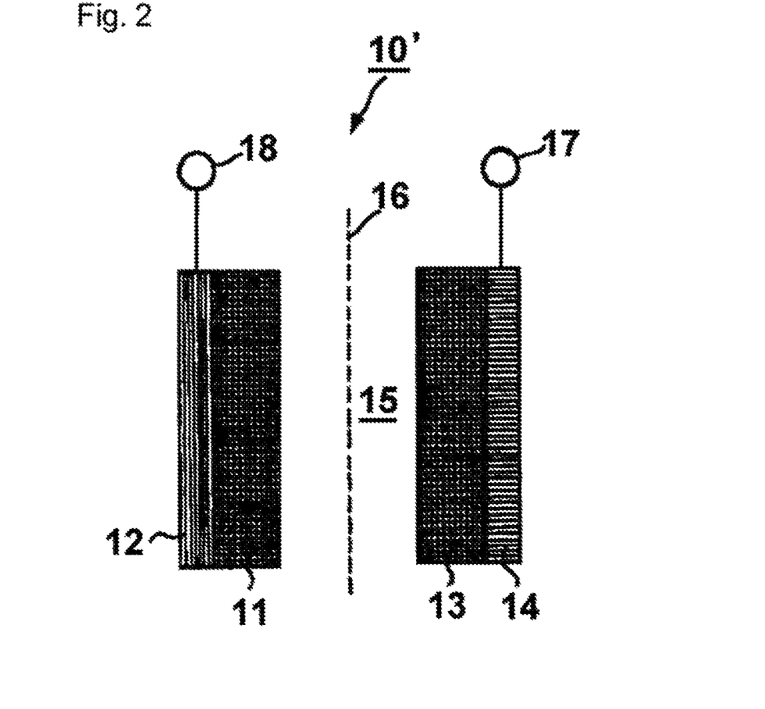
FIG. 2 schematically illustrates the basic structure of a cylindrical nonaqueous secondary battery according to the invention.
Figure 3:
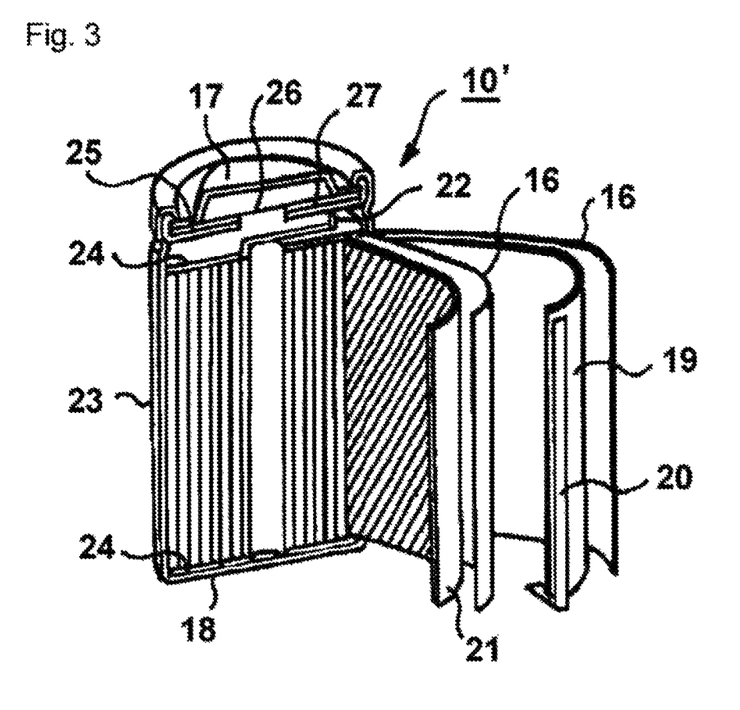
FIG. 3 is a perspective view, with parts exploded and parts in cross-section, illustrating an internal structure of a cylindrical nonaqueous secondary battery of the invention.

As illustrated in FIGS. 2 and 3, the cylindrical battery 10' includes an anode 11, an anode current collector 12, a cathode 13, a cathode current collector 14, a nonaqueous electrolyte 15 of the invention, a separator 16, a cathode terminal 17, a anode terminal 18, an anode plate 19, an anode lead 20, a cathode plate 21, a cathode lead 22, a case 23, an insulating plate 24, a gasket 25, a safety valve 26, and a PTC element 27.

Example

The invention will now be illustrated in greater detail with reference to Examples and Comparative Examples, but it should be understood that the invention is not construed as being limited thereby. Unless otherwise noted, all parts and percentages are by mass.

Examples 1 to 24 and Comparative Examples 1 to 7 present examples of the nonaqueous electrolyte and nonaqueous secondary battery of the invention and their comparative examples.

Fabrication and Evaluation of Nonaqueous Secondary Battery:

Nonaqueous secondary batteries (lithium secondary batteries) of Examples and Comparative Examples were fabricated in accordance with the following procedures.

Making of Cathode

Ninety parts of $LiMn_2O_4$ as an active material, 5 parts of acetylene black as an electroconductive material, and 5 parts of polyvinylidene fluoride as a binder were mixed, and the mixture was dispersed in 140 parts of N-methyl-2-pyrrolidone to prepare a slurry. The slurry was applied to an aluminum current collector, dried, and pressed to make a cathode plate, which was cut to size to provide a disk-shaped cathode.

Making of Anode

Synthetic graphite (97.0 parts) as an active material, 1.5 parts of styrene-butadiene rubber as a binder, and 1.5 parts of carboxymethyl cellulose as a thickener were mixed, and the mixture was dispersed in 120 parts of water. The resulting slurry was applied to a copper current collector, dried, and pressed to make an anode plate, which was cut to size to provide a disk-shaped anode.

Preparation of Electrolyte Solution $LiPF_6$ was dissolved in a mixed solvent consisting of 30 vol % ethylene carbonate, 40 vol % ethyl methyl carbonate, and 30 vol % dimethyl carbonate in a concentration of 1 mol/l to prepare an electrolyte solution.

Preparation of Nonaqueous Electrolyte

Compounds as additives for electrolyte solutions shown in Table 1 and 2 were dissolved in the electrolyte solution obtained above to prepare nonaqueous electrolytes of the invention and comparative nonaqueous electrolytes. In Table 1 and 2, the figures in the parentheses represent the concentrations (mass %) in the nonaqueous electrolyte. The compounds as components (A) and (B) in Table 1 and 2 are shown below.

Component (A)
  A-1: Bis(trimethylsilyl) fumarate
  A-2: Bis(trimethylsilyl) itaconate
Component (B)
  B-1: Compound B-1, unsaturated bond equivalent: 46.8
  B-2: Compound B-2, unsaturated bond equivalent: 51.4
  B-3: Compound B-3, unsaturated bond equivalent: 61.4
  B-4: Compound B-4, unsaturated bond equivalent: 60.1
  B-5: Compound B-5, unsaturated bond equivalent: 86.2
  B-6: Compound B-6, unsaturated bond equivalent: 106.1
  B-7 Compound B-7 unsaturated bond equivalent: 99.1
  B-8: Compound B-8, unsaturated bond equivalent: 63.6
  B-9: Compound B-9, unsaturated bond equivalent: 88.5
  B-10: Compound B-10, unsaturated bond equivalent: 107.1
  B-11: Compound B-11, unsaturated bond equivalent: 106.1
  B-15: Compound B-15, unsaturated bond equivalent: 86.2
  B-16: Compound B-16, unsaturated bond equivalent: 86.2

Assembly of Battery

The disk-shaped cathode and anode were put into a case with a 25 μm thick polyethylene microporous film interposed therebetween. Each of the nonaqueous electrolytes prepared as above was poured into the case, and the case was closed and sealed to make coin-shaped nonaqueous secondary batteries (20 mm diameter, 3.2 mm thick) of Examples and Comparative Examples.

The lithium secondary batteries of Examples and Comparative Examples were tested by the test methods described below. The test results obtained are shown in Tables 1 and 2.

Test Method for Determination of Discharge Capacity Ratio (Initial Characteristics)

The lithium secondary battery was placed in a thermostat at 20° C. The lithium secondary battery was charged by the CC/CV method at a constant charging current of 0.3 mA/cm$^2$, which corresponded to a rate of 0.2 C, to 4.2 V and then discharged at a constant discharging current of 0.3 mA/cm$^2$, which corresponded to a rate of 0.2 C, to 3.0 V for 5 cycles. Thereafter, the battery was charged by the CC/CV method at a constant charging current 0.3 mA/cm$^2$ to 4.2 V and discharged at a constant discharging current of 0.3 mA/cm$^2$ to 3.0 V. The discharge capacity in the 6th discharge was taken as an initial discharge capacity of the battery. A ratio of the initial discharge capacity as measured to that of the battery in which only 1 part of component (A) was added to the electrolyte was calculated as follows to give a discharge capacity ratio (%), the discharge capacity ratio of the battery in which only 1 part of component (A) was added to the electrolyte being taken as 100. The results shown in Table 1 are of the batteries in which compound A-1 was used as component (A), and those in Table 2 are of the batteries in which compound A-2 was used as component (A).

Discharge capacity ratio (%)=[(initial discharge capacity)/(initial discharge capacity of battery in which only 1 part of component (*A*) was used)]×100

Test Method for Determination of Discharge Capacity Ratio (Cycle Characteristics)

The lithium secondary battery after the initial characteristics test was placed in a thermostat at 60° C. The lithium secondary battery was charged at a constant charging current of 1.5 mA/cm$^2$, which corresponded to a rate of IC (a rate of IC means that an entire battery capacity will be discharged in one hour), to 4.2 V and then discharged at a constant discharging current of 1.5 mA/cm$^2$ to 3.0 V for a total of 150 cycles. The discharge capacity in the 150th cycle was taken as a discharge capacity after cycles. A ratio of the discharge capacity after cycles to that of the battery in which only 1 part of component (A) was added to the electrolyte was calculated as follows to give a discharge capacity retention (%) after cycles, the discharge capacity retention after cycles of the battery in which only 1 part of component (A) was added to the electrolyte being taken as 100. The results shown in Table 1 are of the batteries in which compound A-1 was used as component (A), and those in Table 2 are of the batteries in which compound A-2 was used as component (A).

Cycle characteristics (%)=[(discharge capacity after cycles)/(discharge capacity after cycles of battery in which only 1 part of component (A) was used))]×100

TABLE 1

| | Component (A) | Component (B) | Discharge Capacity Ratio (%) | |
|---|---|---|---|---|
| | | | Initial | After Cycles |
| Example 1 | A-1 (0.5) | B-1 (0.5) | 101 | 111 |
| Example 2 | A-1 (0.5) | B-1 (0.3) | 101 | 111 |
| Example 3 | A-1 (0.5) | B-2 (0.5) | 100 | 110 |
| Example 4 | A-1 (0.5) | B-2 (0.3) | 102 | 111 |
| Example 5 | A-1 (1.0) | B-2 (0.3) | 102 | 111 |
| Example 6 | A-1 (1.0) | B-3 (0.3) | 100 | 105 |
| Example 7 | A-1 (1.0) | B-4 (0.3) | 101 | 105 |
| Example 8 | A-1 (0.5) | B-5 (0.5) | 101 | 110 |
| Example 9 | A-1 (0.5) | B-5 (0.3) | 102 | 111 |
| Example 10 | A-1 (1.0) | B-5 (0.3) | 102 | 111 |
| Example 11 | A-1 (0.5) | B-5 (0.1) | 100 | 106 |
| Example 12 | A-1 (0.5) | B-6 (0.5) | 100 | 106 |
| Example 13 | A-1 (0.5) | B-6 (0.3) | 100 | 105 |
| Example 14 | A-1 (1.0) | B-6 (0.3) | 102 | 105 |
| Example 15 | A-1 (1.0) | B-7 (0.3) | 100 | 106 |
| Example 16 | A-1 (1.0) | B-8 (0.3) | 100 | 103 |
| Example 17 | A-1 (1.0) | B-9 (0.3) | 100 | 105 |
| Example 18 | A-1 (1.0) | B-10 (0.3) | 100 | 102 |
| Example 19 | A-1 (1.0) | B-11 (0.3) | 100 | 102 |
| Example 20 | A-1 (1.0) | B-15 (0.3) | 101 | 110 |
| Example 21 | A-1 (1.0) | B-16 (0.3) | 101 | 108 |
| Comp. Ex. 1 | A-1 (1.0) | — | 100 | 100 |
| Comp. Ex. 2 | A-1 (1.3) | — | 100 | 100 |
| Comp. Ex. 3 | — | B-1 (1.0) | 101 | 102 |
| Comp. Ex. 4 | — | B-1 (0.3) | 101 | 102 |
| Comp. Ex. 5 | — | B-10 (0.3) | 99 | 98 |
| Comp. Ex. 6 | A-1 (1.0) | B'-1 (0.3) | 98 | 86 |

TABLE 2

| | Component (A) | Component (B) | Discharge Capacity Ratio (%) | |
|---|---|---|---|---|
| | | | Initial | After Cycles |
| Example 22 | A-2 (1.0) | B-2 (0.3) | 100 | 108 |
| Example 23 | A-2 (1.0) | B-5 (0.3) | 99 | 109 |
| Example 24 | A-2 (1.0) | B-6 (0.3) | 100 | 105 |
| Comp. Ex. 7 | A-2 (1.0) | — | 100 | 100 |

[Chem. 9]

B'-1

Unsaturated bond equivalent: 162.2

It is apparent from the above results that the components (A) and (B) used in the nonaqueous electrolyte of the invention are capable of inhibiting an increase in voltage in the case of overcharge without reducing the battery characteristics (discharge capacity).

REFERENCE SIGNS LIST

1 Cathode
1a Cathode current collector
2 Anode
2a Anode current collector
3 Electrolyte
4 Cathode case
5 Anode case
6 Gasket
7 Separator
10 Coin-shaped nonaqueous secondary battery
10' Cylindrical nonaqueous secondary battery
11 Anode
12 Anode current collector
13 Cathode
14 Cathode current collector
15 Electrolyte
16 Separator
17 Cathode terminal
18 Anode terminal
19 Anode plate
20 Anode lead
21 Cathode
22 Cathode lead
23 Case
24 Insulating plate
25 Gasket
26 Safety valve
27 PTC element

The invention claimed is:

1. A nonaqueous electrolyte comprising:
an organic solvent,
a lithium salt dissolved in the organic solvent,
(A) at least one compound represented by general formula (1):

[Chem. 1]

(1)

wherein R$^1$ represents an n-valent unsaturated hydrocarbon group having 2 to 6 carbon atoms or an n-valent arylene group having 6 to 12 carbon atoms; R$^2$, R$^3$, and R$^4$ each independently represent a saturated aliphatic hydrocarbon group having 1 to 20 carbon atoms or an aromatic hydrocarbon group having 6 to carbon atoms; and n represents an integer 2 to 6, and

- (B) at least one of compounds B-1, B-2, B-3, B-5, B-6, B-7, B-8, B-9, B-10, B-11, B-12, B-13, B-14, B-15, B-16, and B-17:

[Chem. 2]

B-1

B-2

B-3

B-5

B-6

B-7

B-8

B-9

B-10

B-11

[Chem. 3]

B-12

B-13

B-14

B-15

B-16

B-17

2. The nonaqueous electrolyte according to claim 1, wherein the compound as component (B) has an ethylenically and acetylenically unsaturated bond equivalent of 150 or smaller.

3. A nonaqueous secondary battery comprising the nonaqueous electrolyte according to claim 1.

4. A nonaqueous secondary battery comprising the nonaqueous electrolyte according to claim 2.

* * * * *